United States Patent [19]
Louison

[11] 3,908,927

[45] Sept. 30, 1975

[54] FISHING REEL

[76] Inventor: Claude Joseph Louison, 11 rue Cotatay, Le Chambon Feugerolles, Loire, France

[22] Filed: May 8, 1973

[21] Appl. No.: 358,444

[30] Foreign Application Priority Data
Nov. 5, 1971 France .............................. 71.40698

[52] U.S. Cl. ............................................ 242/84.21 A
[51] Int. Cl.² ........................................... A01K 89/01
[58] Field of Search. 242/84.21 A, 84.21 R, 84.2 A, 242/84.2 G

[56] References Cited
UNITED STATES PATENTS
| | | | |
|---|---|---|---|
| 3,059,872 | 10/1962 | Griffis | 242/84.2 A |
| 3,095,158 | 6/1963 | Louison | 242/84.21 A |
| 3,296,731 | 1/1967 | Wood | 242/84.21 A |

FOREIGN PATENTS OR APPLICATIONS
| | | | |
|---|---|---|---|
| 81,743 | 8/1963 | France | 242/84.21 A |

*Primary Examiner*—Billy S. Taylor
*Attorney, Agent, or Firm*—Sughrue, Rothwell, Mion, Zinn & Macpeak

[57] ABSTRACT

The fishing reel is provided with a line pick-up member which is pivoted on a drum which in turn is rotatable about an axially reciprocating spool. A thrust-ring is mounted for rotary movement with the drum and is guided for axial reciprocating movement relative thereto. The thrust-ring is operatively connected to the pick-up member and upon the shifting of the thrust-ring by means of a spring biased plunger the pick-up member can be moved between a line winding position and a line unwinding position. A latch is provided to engage the thrust-ring when the pick-up member is moved to the line unwinding position and the latch can be released either manually by rotating the latch member or automatically by rotating the drum in the line winding direction.

3 Claims, 15 Drawing Figures

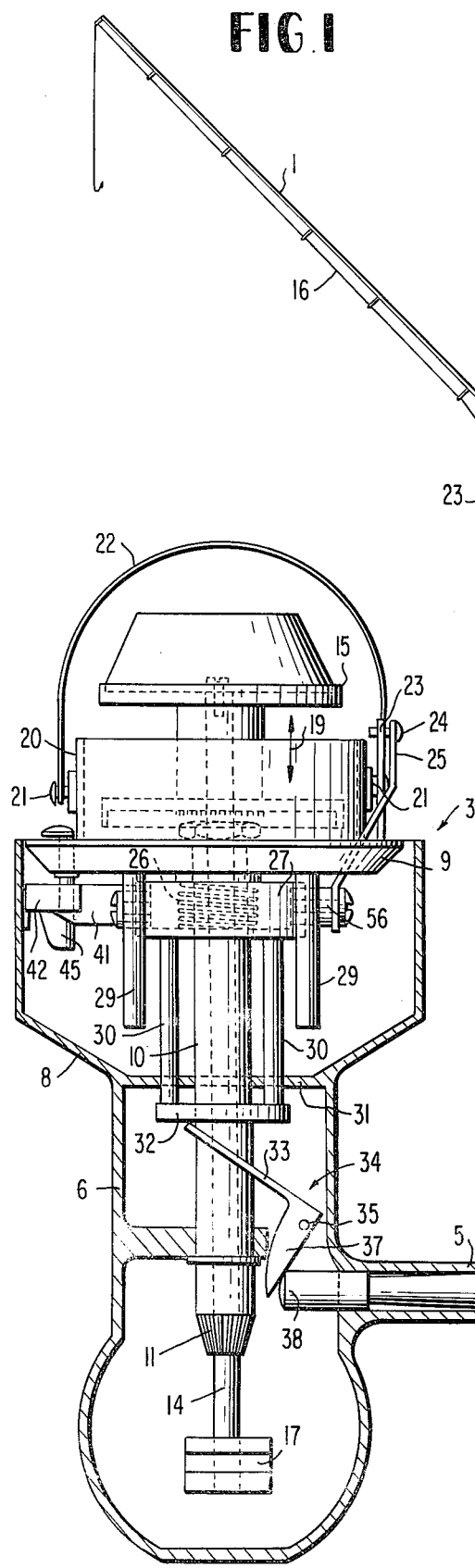
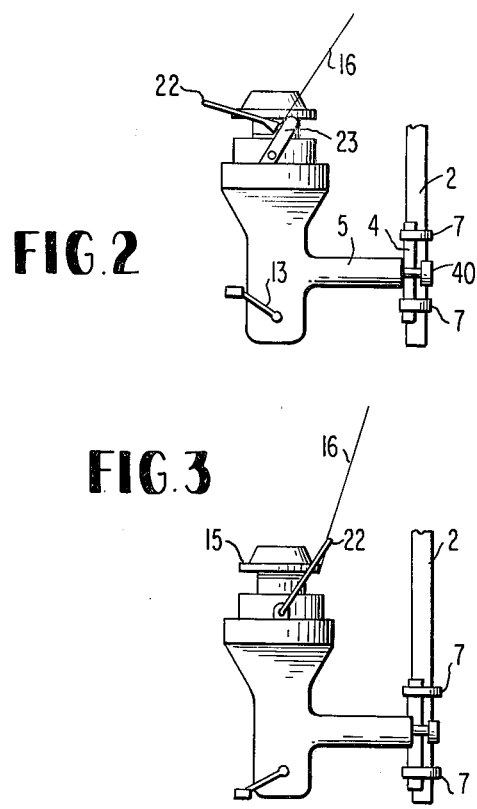
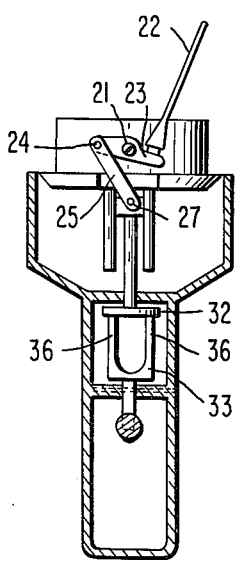

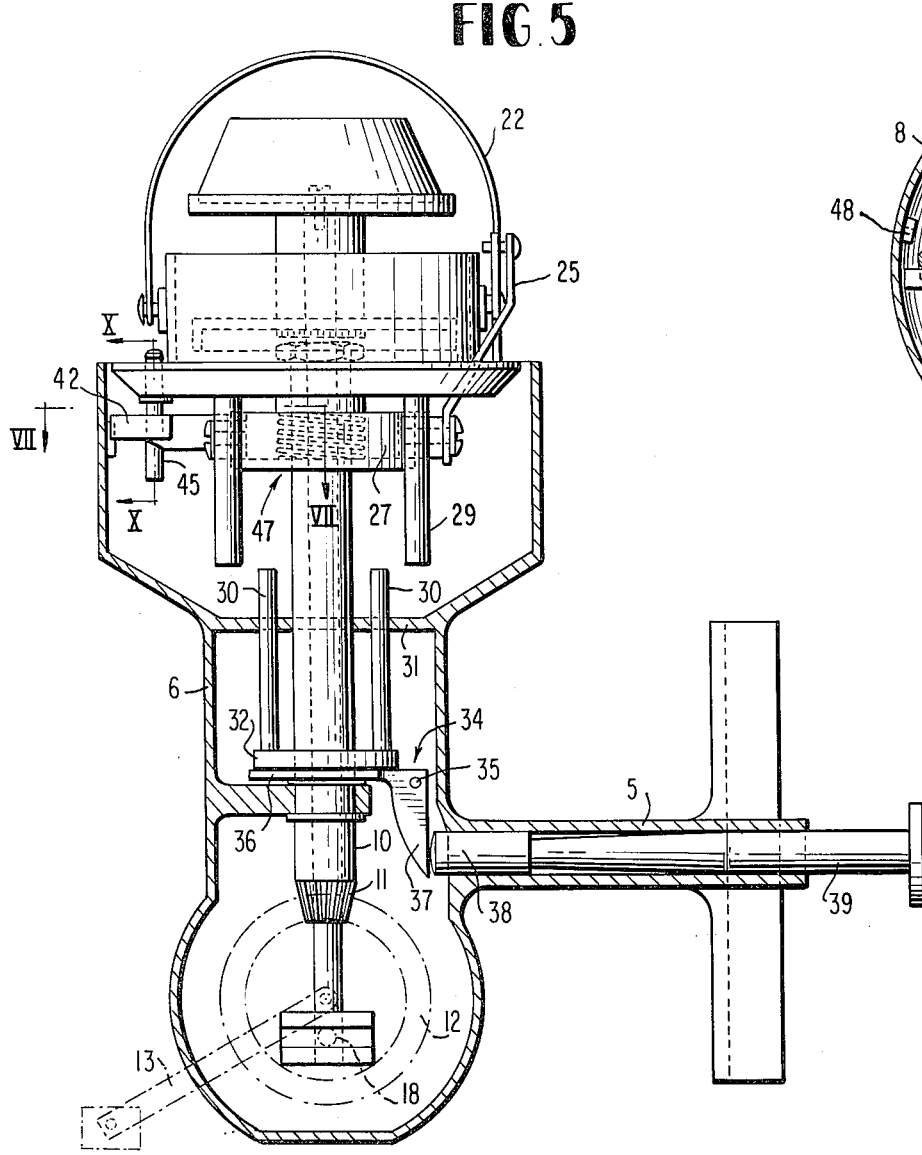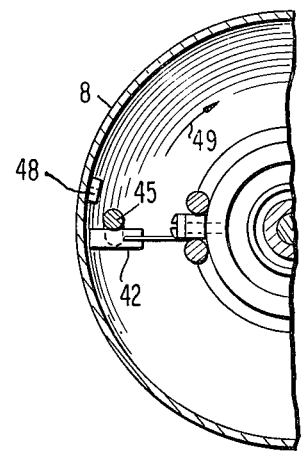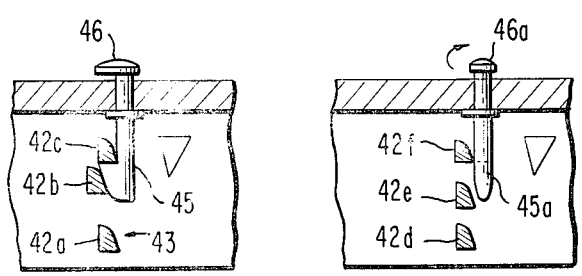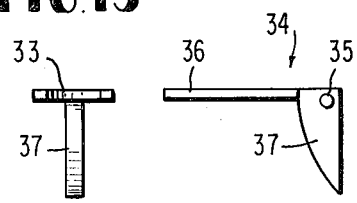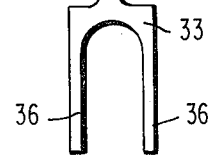

FISHING REEL

The present invention relates to a reel intended to be fitted to fishing rods, both for spinning and ground-bait fishing, and also for fishing with a fixed rod. More generally, the invention involves any fishing gears provided with reels.

It is known that a fishing reel includes a spool for winding the line, and a bow which is called "bail" or "pick-up". This pick-up has a cranked profile, and is capable of rocking on its ends about a pin which is substantially disposed along one diameter of the spool. Moreover, the pick-up and the support therefor rotate round the spool when the angler actuates the handle of the reel.

When the pick-up is in its normal position of rest, it lies across the path of the line, so that upon rotating it causes the line to wind automatically on the spool. On the other hand, if the pick-up is rocked about its axis to its opposite position, it collapses out of the path of the line, so that the latter can unwind freely from the spool.

The usual reels are hand-operated. In other words, when the angler wants to unwind the line, while he holds already the handle of the rod in his right hand, with the reel lying between the second finger and the third finger of said hand, he uses his left hand to grip the pick-up and bring it down to the required position. Since the line is thus freed, the angler cannot spin the spoon-bait and the hook without braking said line during the initial stage of the operation. Such braking is achieved by various means; some anglers hold the line by means of the forefinger of the right hand at the beginning of the spinning operation, and then release it while the spinning is in progress. As is known, such a handling is difficult and, besides, rather uneasy since it requires using both hands.

Other known reels are so-called "automatic" reels, in which case the rocking of the pick-up to enable the line to unwind from the spool is achieved by the actuation of a release member specially provided for the purpose. When the user stops acting upon said member, the pick-up comes back automatically to the position wherein it causes the line to be wound. The anglers know that the automatic reels of known types ensure a very inadequate spinning accuracy, that is, the bait is thrown roughly towards the "target", but is not accurately "shot" at a well-defined spot.

The object of the invention is to obviate such drawbacks by providing a fishing reel adapted to be used at will, either with automatic operation through finger pressure, or in the usual way through mere release.

Lastly, this improved reel is adapted to be fitted to any commercially available type of fishing rod.

A fishing reel according to the invention includes in the usual way a rotary spool reciprocating axially, which is surrounded by a rotary drum, the axial position of which is fixed, while a line-guiding dropping basket-handle is linked onto a substantially diametral axis of said drum, said assembly rotating within a fixed protective cup, and it is characterized in that it includes in combination, on the one hand, pivoted members connecting the basket handle to a thrust-ring disposed under the bottom of the drum coaxially to the latter, said ring rotating together with the drum and being adapted to slide in axial direction with respect to said drum against resilient means which tend to return to the axial position correponding to the collapsed basket handle allowing the line to be wound. a member which slides coaxially to said ring being provided to allow pushing back the latter against its return means under the action of a push-member which is guided by the fixed outer casing of the reel in order to be actuated by a single finger of the user, while, on the other hand, the drum is fitted with retaining means adapted to hook the sliding ring automatically and to hold it against the resilient return means thereof, so as to keep said ring in a position which corresponds to the line re-winding position of the basket handle.

It will be seen that, if the angler makes the retaining means for the ring collapse under the bottom of the drum, said ring is able to slide freely in either direction, whereby the angler can use the reel by automatic operation, that is, he may, by means of one of his fingers, actuate or not the trigger or push member on the reel to cause the basket handle to rock in either direction.

On the contrary, if the angler leaves the retaining means for the ring in their operative position, the reel can be used by manual operation, that is, the angler grips the basket handle directly with his hand to bring it to its position wherein the line is allowed to unwind.

According to another feature of the invention, the sliding ring is fitted with an elastic strip which extends radially therefrom and ends in a latch adapted to engage resiliently behind the nose of a hook integral with the drum, said hook constituting the retaining means for the ring when the basket handle is in a position wherein the line can be unwound. The engagement of the latch behind the nose of the hook is obtained by the strip on the ring bending transversely. A further feature of the invention consists in mounting said hook in the drum in a manner such that it is adapted to move aside, such moving aside of the nose of the hook being obtained, for instance, merely by rotating said hook.

Another feature of the invention consists in giving the latch a size such that it extends beyond the hook towards the periphery of the reel, while, on the other hand, a raised boss is provided on the inner surface of the fixed cup to retain the end of said latch and clear it from the nose of the hook which moves together with the drum, as soon as said drum is rotated in the direction corresponding to the re-winding of the line.

Owing to this arrangement, when the angler has chosen to leave the retaining hook in its operative position, he is able to use his reel exactly in the same way as a conventional hand-operated reel.

The appended drawing, which is given by way of non-limiting example, will enable the features of the invention to be more readily understood.

FIG. 1 shows a fishing rod fitted with a reel according to the invention.

FIG. 2 shows said reel with its bail in a position wherein the line can be re-wound.

FIG. 3 shows the bail in a position wherein the line can be unwound.

Figure 6:
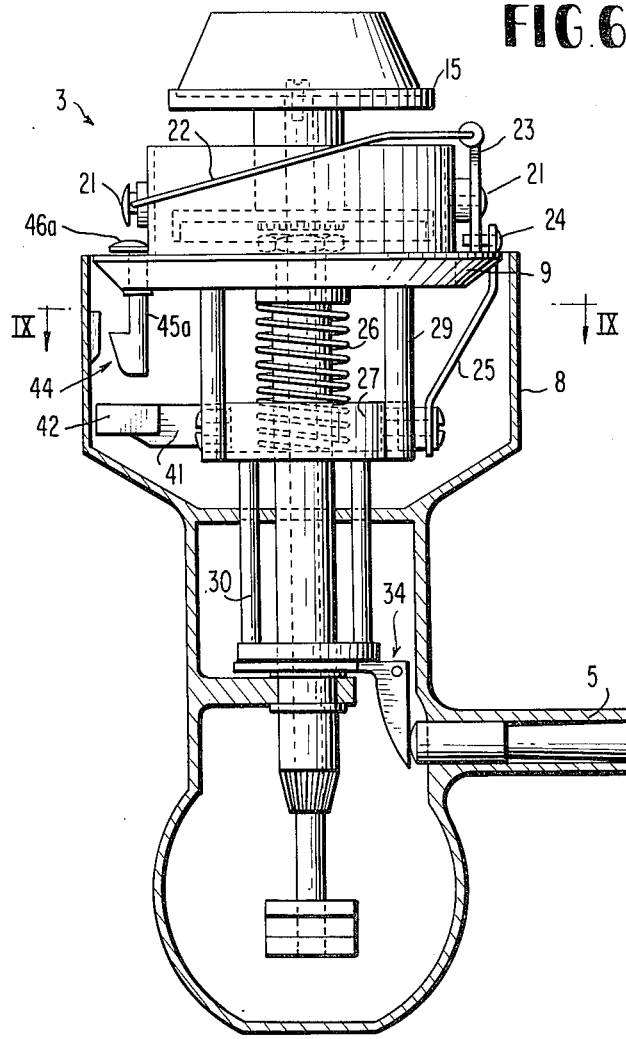

FIGS. 4, 5, and 6 are axial sections of the reel unit, and show various possible positions of use.

FIG. 7 is a section along line VII—VII of FIG. 5.

Figure 8:
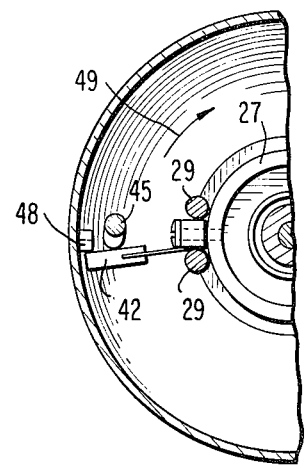

FIG. 8 is a similar section showing the unlocking of the latch of the thrust ring.

Figure 9:
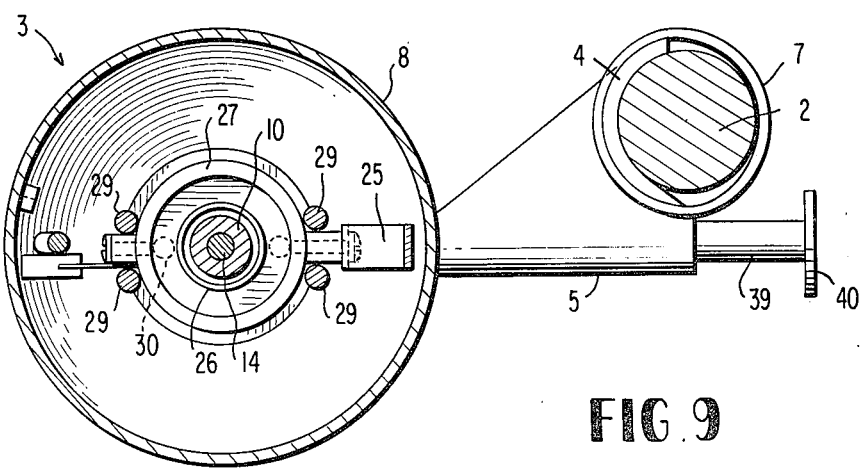

FIG. 9 is a plan sectional view along line IX—IX of FIG. 6, and shows the hook moved aside in the position of automatic operation.

FIG. 10 is a section along line X—X of FIG. 5, and shows the way in which the retaining latch for the thrust ring is hooked automatically when the hook is in its operative position.

FIG. 11 is a similar section which illustrates the operation when the hooked is rotated to its moved aside position.

FIG. 12 is a side view of the cranked lever controlling the automatic operation.

FIG. 13 is a front view of said lever.

FIG. 14 is a plan view of same.

FIG. 15 is a partial longitudinal section of the reel with the bail in casting position.

FIG. 1 shows a fishing rod 1, onto the handle 2 of which a reel 3 according to the invention is fitted. Said reel includes a gutter-shaped bracket 4 connected by a transverse leg 5 to a fixed casing 6. The reel is mounted on the rod 1 by positioning rings or bonds 7 which tie the bracket 4 onto the handle 2 of said rod. The reel according to the invention is thus adapted to be mounted readily and in the usual way onto any type of fishing rod.

The upper part of the casing 6 defines a fixed protective cup 8 which opens upwardly. A drum 9 is adapted to rotate within said cup 8. The hollow shaft 10 of said drum 9 is provided with a lower bevel pinion 11 which is rotatively driven by a toothed crown wheel 12 of the usual type. The latter is actuated by the angler by means of a crank 13 (FIGS. 2 and 5) on the outside of the casing 6.

The shaft 10 of the drum 9 is hollow, and a rod 14 slides within it, the top of said rod carrying a spool 15 on which the line 16 of the fishing rod 1 winds.

The lower part of the rod 14 is provided with a transverse slideway 17 which engages in the usual way on a set over finger 18 on the toothed crown wheel 12 (FIG. 5). Thus, when the angler rotates the crank 13, the drum 9 is rotatively driven, while keeping a fixed axial position, whereas, on the contrary, the spool 15 does not rotate but reciprocates axially, as indicated diagrammatically by the double arrow 19 in FIG. 4.

The drum 9 is topped by a skirt 20 which surrounds the spool 15 and carries the linking points 21 for a pick-up or bail 22.

Said pick-up has a cranked area which defines an angular location 23 into which the line 16 comes to lodge when the pick-up 22 is dropped about its diametral axis 21 to the position in which the line can be re-wound (FIGS. 2 and 6).

On the other hand, the pick-up 22 is connected to one end of a connecting rod 25 through a linking pin 24, while the other end of said connecting rod is provided with a transverse pin 56. The latter is integral with a thrust ring 27, which is fitted below the drum 9 about the hollow shaft 10, along which it slides freely. A compression spring 26 is interposed between the bottom of the drum 9 and the ring 27 to return the latter downwards, that is, to the position illustrated in FIG. 6, wherein the connecting rod 25 holds the basket handle 22 in the position enabling the line 16 to be wound.

The ring 27 slides between guides 29 which are integral with the drum 9, and extend from the bottom thereof. consequently, the ring 27 can slide freely along the shaft 10, but the guides 29 compel it to rotate together with the drum 9.

The lower surface of the ring 27 can bear upon the top of fingers 30 (FIG. 5) which slide freely through a fixed transverse partition 31 of the casing 6. Said fingers 30 are integral with a plate 32 under which the fork 33 of a cranked lever 34 is disposed. Said lever is pivoted near its angular portion to a pin 35 which is integral with the casing 6. The fingers 36 of the fork 33 (FIG. 14) engage under the plate 32 on either side of the hollow shaft 10.

The cranked lever 34 has another arm 37, which is substantially perpendicular to the plane of the fork 33 and adapted to receive the pushing of the end 38 of a pusher rod 39. The latter slides inside the leg 5, which is hollow, and it projects outside to end in a knob 40 located near the fixing bracket 4 (FIG. 9). Thus, when the reel 3 is fitted onto the handle 2 of the fishing rod, the push-botton 40 lies by the side of said handle. Consequently, the angler can depress the knob 40 by means of the thumb of his hand which holds the handle 2. The other hand of the angler remains free, whereby the movements of the angler are facilitated, in particular when he is spinning in a sporting way.

The thrust ring 27 includes a flexible strip 41, which extends radially outwards and ends in a rigid latch 42. Said latch has preferably the transverse section illustrated in FIGS. 10 and 11, that is, it has an oblique side surface 43 which allows it to rise automatically along the likewise oblique surface 44 of a retaining hook 45 (FIG. 6). The stem of said hook passes through the bottom of the drum 9 and is adapted to be rotated by 90° by means of a central knob 46 on the outer surface of said drum 9 (FIG. 6).

In one of the possible angular positions of the hook 45 (FIGS. 5, 7, 10) the nose of said hook lies across the path normally followed by the latch 42 when the ring 27 rises as indicated by the arrow 47 in FIG. 5. Thus, when the ring 27 is raised in said direction by some means or other as will be described later on, the latch 42, which lies first at the position 42a (FIG. 10), begins by moving aside to the position 42b as a result of the elastic deflection of the spring strip 41 (FIG. 8) and then comes back to the position 42c to engage behind the nose of the hook 45. Ring 27 is then locked in its uppermost position, the spring 16 being compressed, while the basket handle or pick-up 22 lies in its open position, which corresponds to the free unwinding of the line 16 (FIGS. 3 and 5).

On the other hand, if the angler brings the hook 45 to its other possible position (FIGS. 4, 6 and 11), the nose of said hook does not lie across the path of the latch 42 any longer, so that the latter can go up and down freely along the stem of the hook (positions 42c, 42e, 42f in FIG. 11).

Lastly, a raised boss 48 is provided on the inner surface of the fixed cup 8, said boss being adapted to retain the end of the latch 42 when the latter is locked in its uppermost position by the hook 45 (position 42c in FIG. 10) and the drum 9 is rotated. In this case the drum 9, the guides 29, the hook 45 and the ring 27 all rotate together (FIG. 8, arrow 49), so that, when the latch 42 encounters the boss 48, said latch remains held by the latter while the hook 45 proceeds on its path. The latch 42 thus frees itself from the nose of the hook 45 through a deflection of the spring strip 41, and releases the spring 26 which then brings the ring 28 back from the uppermost position (FIG. 5) to the lowermost position thereof (FIG. 6). Through the action of the connecting rod 25, this motion also brings the basket handle 22 back from the position wherein the line can be unwound (FIGS. 3 and 5) to the position wherein the line can be re-wound (FIGS. 2 and 6).

The operation is as follows:

When the angler wants to use the reel by manual operation, he is not compelled to operate the push-button 40. In order to bring the basket handle or pick-up 22 from the winding position (FIG. 2) to the unwinding position (FIG. 3), he can grip the pick-up 22 with its hand and rock it in the usual way. Thus, the connecting rod 25 causes the ring 27 to rise in the direction of the arrow 47 up to the position shown in FIG. 5, wherein said ring 27 will be locked in its uppermost position through its latch 42 (position 42c in FIG. 10).

If the angler then rotates the crank 13 of his reel, the drum 9 starts rotating and, as soon as the latch 42 encounters the fixed boss 48 (FIGS. 7 and 8), said latch gets clear from the hook 45, and the spring 26 brings the ring 27 back to its lowermost position, that is, the basket handle 22 comes back to the winding position shown in FIG. 2.

On the other hand, if the angler wants to use his reel with automatic operation, it is only necessary for him to rotate the knob 46 to bring the rotary hook 45 to the moved aside position shown in FIGS. 4, 6, 9, and 11. Under such conditions, if the angler depresses the push-button 40 with his thumb (arrow 50, FIG. 4) the fork 33 rocks and lifts the plate 32, which in turn lifts the ring 27. The basket handle 22 rocks to the unwinding position (FIGS. 3, 4, and 15). On the other hand, as soon as the angler releases the push-button 40, the pushing of the spring 26 brings the ring 27 back to the lowermost position shown in FIG. 6, that is, the pick-up 22 comes back to the winding position shown in FIGS. 2 and 6.

It should be understood, besides, that different but technically equivalent means could be used for moving the hook 45 aside when it is wanted to use the reel with automatic operation, such means remaining within the scope of the invention. For instance, an axial sliding of said hook 45 could be provided, with locking means allowing to hold said hook fast either in its operative position or in its moved aside position.

I claim:

1. A fishing reel comprising protecting cup means, drum means rotatably mounted in said cup means, spool means mounted for reciprocating movement along the rotary axis of said drum means, drive means for rotating said drum means and reciprocating said spool means, pick-up means pivotally mounted on said drum means at diametrically opposed points, a thrust-ring connected to said drum means for rotation therewith and for axial movement relative thereto, connecting means operatively connecting said pick-up means to said thrust-ring, spring means normally biasing said ring away from said drum means to pivot said pick-up means to a position allowing a line to be wound on said spool means, actuator means for selectively shifting said ring against said spring means to pivot said pick-up means to a position allowing a line to be withdrawn from said spool and latch means for selectively engaging said ring when said ring is shifted axially against said spring means to maintain the pick-up means in the unwinding position; said latch means includes spring finger means secured to and extending radially outwardly from said thrust-ring and an axially extending hook member pivotally mounted on said drum means for movement between a first position wherein the hook member will engage said spring finger means to hold said ring against the force of said spring means and a second position wherein the hook member will be disposed out of the path of axial movement of said ring to prevent engagement therewith.

2. A fishing reel as set forth in claim 1 wherein said spring finger means is provided with a rigid latch member at the free end thereof having a beveled surface and said hook member is provided with a nose portion having a complementary beveled surface to facilitate automatic engagement of said latch means when said hook member is disposed in said first position.

3. A fishing reel as set forth in claim 2 wherein said rigid latch member extends into close proximity to said protective cup means and further comprising boss means provided on the inner surface of said cup means in the plane of rotation of said rigid latch member when said latch member is engaged by said hook member whereby upon rotation of said drum means the latch means will automatically be disconnected to allow said spring means to shift said thrust-ring away from said drum means.

* * * * *